United States Patent [19]

Burnett

[11] Patent Number: 4,461,395

[45] Date of Patent: Jul. 24, 1984

[54] REUSABLE, MODULAR, KNOCKDOWN CONTAINER

[76] Inventor: Robert A. Burnett, 1530 Eastlake Ave. E., Seattle, Wash. 98102

[21] Appl. No.: 284,983

[22] Filed: Jul. 20, 1981

[51] Int. Cl.³ .............................................. B65D 8/14
[52] U.S. Cl. .................................... 217/12 R; 217/65; 217/69; 220/4 F
[58] Field of Search .................... 217/12 R, 13, 45, 24, 217/65, 69; 220/4 F; 46/31

[56] References Cited

U.S. PATENT DOCUMENTS

| | | | |
|---|---|---|---|
| 906,208 | 12/1908 | Dewey et al. | 217/69 |
| 1,335,060 | 3/1920 | Kenniker | 217/12 R |
| 3,235,118 | 2/1966 | Kewley | 217/12 R |
| 4,024,777 | 5/1977 | Rowley | 217/69 |
| 4,083,464 | 4/1978 | Burnett | 217/24 |
| 4,139,113 | 2/1979 | Graham, Jr. | 217/69 |

FOREIGN PATENT DOCUMENTS

| | | | |
|---|---|---|---|
| 147549 | 11/1936 | Austria | 217/12 R |
| 730661 | 5/1932 | France | 217/12 R |
| 728987 | 7/1932 | France | 217/69 |
| 327953 | 3/1958 | Switzerland | 217/69 |
| 753743 | 8/1956 | United Kingdom | 217/65 |

Primary Examiner—Allan N. Shoap
Assistant Examiner—Robert Petrik
Attorney, Agent, or Firm—Seed and Berry

[57] ABSTRACT

An improved, reusable, modular, knockdown container preserves delicate corners necessary for providing sufficient bearing surface and force direction to maintain the package erect by providing a clip-bearing plate associated with each corner to protect the corner during placement and removal of the clip from the container. Notched, interfitting panels are held erect by a resilient clip which fits into routed troughs on adjacent panels. A clip-receiving recess ensures that the clip does not extend upwardly from the surface of the panel. Access means through the clip allow insertion of a bar to wedge between the bearing plate and the clip in prying the clip from its position holding the adjacent panels. Thus the life of the panel is substantially increased.

12 Claims, 4 Drawing Figures

REUSABLE, MODULAR, KNOCKDOWN CONTAINER

DESCRIPTION

Technical Field

The present invention relates to a reusable, modular, knockdown container. More particularly, the invention relates to a modular container having a plurality of interchangeable panels which are held together by recessed, resilient clips.

Background Art

As explained in U.S. Pat. No. 4,083,464, easily assembled, sturdy, and durable knockdown shipping containers are desired to cure a long-standing problem for shippers—dependable containers to protect goods which store in a smaller volume for return. Many attempts have been made to solve this problem. A particularly good solution is provided in U.S. Pat. No. 4,083,464, where a knockdown reusable container has interfitting edges which are secured together by recessed, spring metal clips. While this container protects the clips from inadvertent removal during moving and shipping, and while this container provides a container which is able to withstand higher racking forces, several improvements are still necessary to provide the most desirable knockdown container. In particular, the sharp trough corners necessary to hold the clips (best shown in FIG. 4 of U.S. Pat. No. 4,083,464) often are blunted by placement and removal of the clips. Blunting these edges means either that the clips no longer hold the box rigidly or that the clips are difficult to place. Furthermore, damage to the panels is caused when the clips are pried from their troughs. All too soon, the panels need be replaced.

Conventional knockdown containers have at least two different edges to accommodate the interfitting. Cutting different edges requires resetting the cutting machine, thereby slowing production and increasing the cost. When the boxes are assembled, care must be taken to align the different edges properly.

Disclosure of Invention

To overcome the problems commonly encountered when using recessed, resilient clips, the reusable, modular, knockdown container of this invention includes a clip-bearing plate associated with each clip-retaining trough to protect the corner of the trough between the recessed surface of the panel and the trough during the placement and removal of the clip from the container. Another feature is the inclusion of an access means in the clip through which levering or prying pressure may be applied to the bearing plate to slide the resilient clip tab from its position in the trough.

The panels of this invention further have a repetitive notch arrangement which makes each edge of the panel analogous. No longer are there at least two, separately identifiable edges. A preferred pattern has alternating runs and steps of equal length. Centered within each run or step is a clip-retaining recess. That is, the edge of a panel has a repeating series of a run and a step. The run has a first portion of dimension X, a recessed portion (having a clip-receiving recess) of dimension X, and another portion of dimension X. The step is recessed from the run and has three portions, a first span of dimension X, a span having a clip-retaining recess (of dimension X), and a second span of dimension X. For the first portion of the first run, the dimension is reduced by the thickness of the panel to allow interfitting without obstruction.

The preferred, reusable, modular, knockdown container of the present invention has a plurality of interchangeable panels capable of interfitting to form a geometric solid. To hold the interfitting panels, each panel has at least one clip-receiving recess mounted on each edge of the panel. Pairs of recesses are capable of aligning with each other when the geometric solid is formed. Each recess is capable of receiving a clip so that the clip will be recessed into the outer surface of the panels. The resilient clip has opposed tabs which bear against respective bearing surfaces in the clip-retaining troughs on adjacent panels. Connecting means between the tabs resiliently maintain the tabs, provide bearing force for the tabs by functioning as springs, and are capable of being recessed into the exposed surface of the panels in which the clip sits. By being recessed, the clips are less likely to be removed inadvertently during shipping.

BEST MODE FOR CARRYING OUT THE INVENTION

U.S. Pat. No. 4,083,464 is incorporated by reference into this specification.

Figure 1:
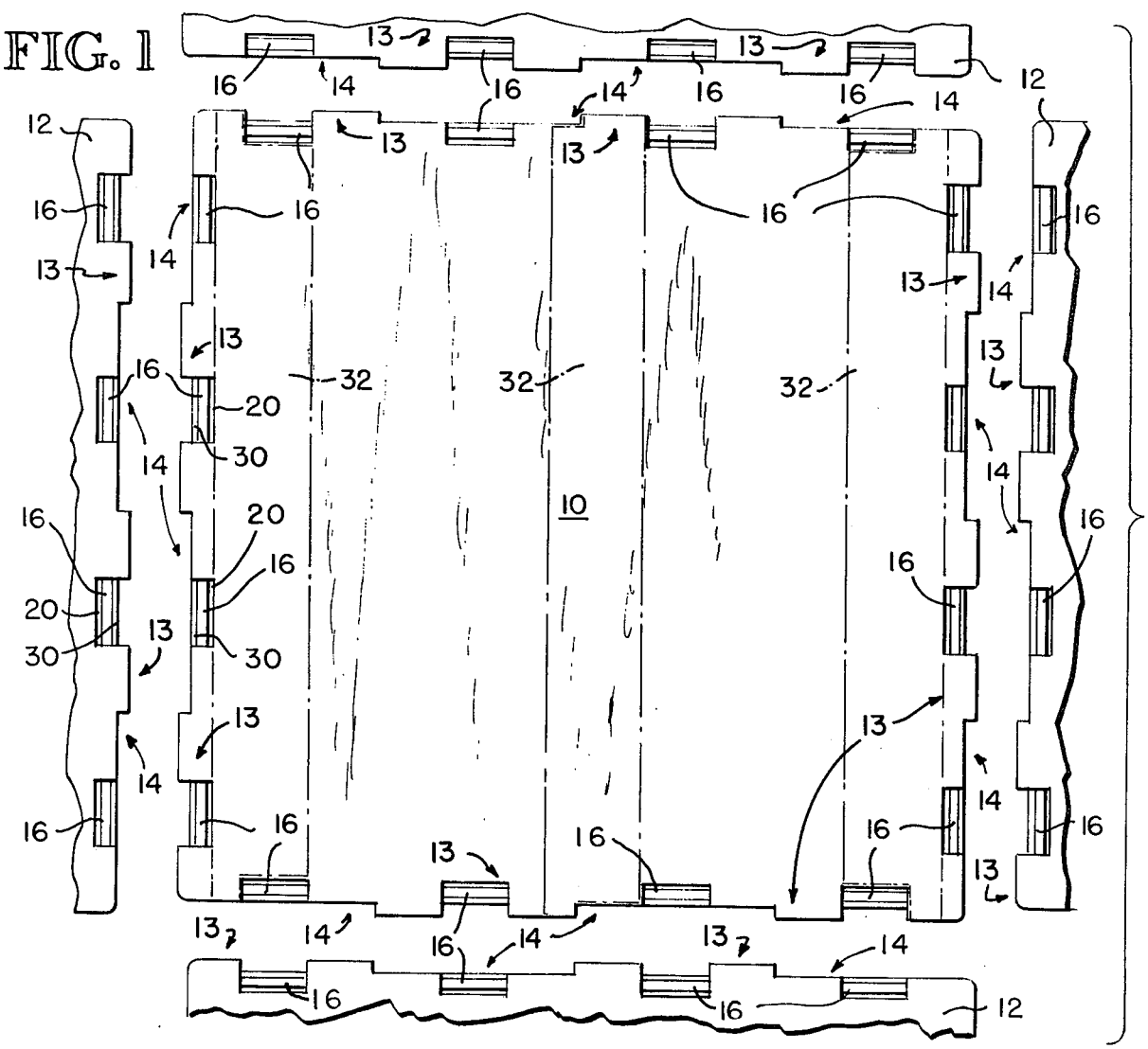
FIG. 1 is a top plan of a preferred panel of this invention.
Figure 2:
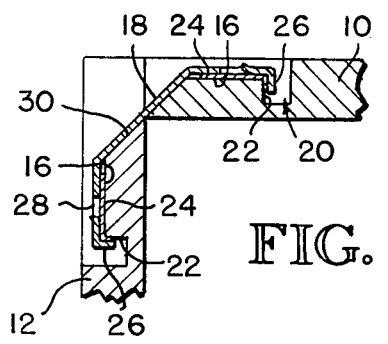
FIG. 2 is a partial section of a geometric solid detailing the clipping arrangement of this invention.
Figure 3:
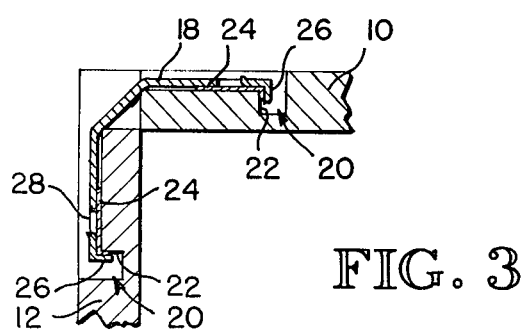
FIG. 3 is a partial section through another geometric solid showing the clipping arrangement using an alternative embodiment of the panels of this invention.
Figure 4:
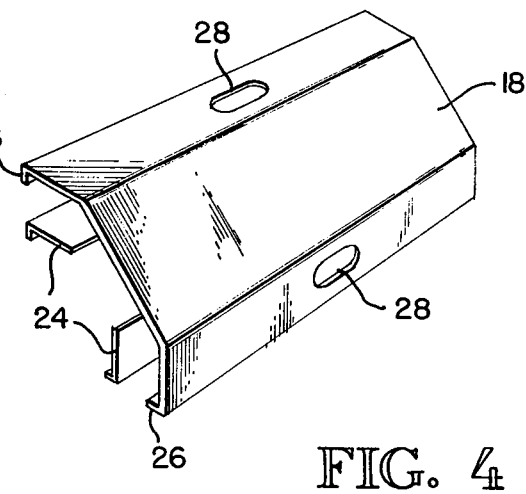
FIG. 4 is a perspective view of the resilient clip of this invention.

As shown in FIG. 1, the preferred panel 10 of this invention readily interfits with the corresponding edge of an adjacent panel 12 to form a right rectangular parallelepiped. Of course, other shapes may be made from panels of various shapes. Alternating runs 13 and steps 14 are provided on the notched edges of the panel 10. Four clip-receiving recesses 16 are also spaced along the edges of the panel 10. In forming a right rectangular parallelepiped, the clip-receiving recesses 16 on one panel align with respective recesses on an adjacent panel. As shown in FIGS. 2 and 3, a clip 18 fits in a clip-retaining trough 20 recessed into one panel and bears against a surface of that trough 20. The clip 18 extends over a clip-bearing plate 24 positioned above the clip-receiving recess 16 to protect the corner between the clip-receiving recess 16 and clip-retaining trough 20. The clip 18 spans the space between respective troughs on interfitting panels 10 and 12 and has its opposed tabs 26 fitting into the respective troughs 20. The opposed tabs 26 bear against bearing surfaces in the troughs to hold the container erect. Preferably, the connecting means between the tabs are entirely recessed below the surface of the respective panels so that the clips 18 will not be inadvertently dislodged from the container during shipping. The connecting means between the tabs resiliently maintains the tabs in their spread conformation and provides a bearing force for the tabs through spring action.

To assemble a container of this invention, the respective panels are interfit and a resilient clip 18 is placed in the respective troughs 20 to bear against the bearing surfaces, thereby holding the container erect. To ease placement and removal of the clips, access means 28 are provided within the connecting means of the clip to allow for levering or prying beneath the clip against the bearing plate. To remove the clip 18 in either FIG. 2 or FIG. 3, for example, a bar, such as a screwdriver, may be inserted through the access means 28 on the connecting means and wedged between the bearing plate 24 and the connecting means. The access means 28 has a raised lip to permit insertion of the bar. A prying motion of the screwdriver against the bearing plate 24 will move the tab 26 of the clip 18 upwardly to disengage it from its frictional bearing connection against the bearing surface of the trough. The bearing plate 24 will provide adequate protection for the fragile corner between the clip-receiving recess 16 and the clip-retaining trough 20. But for the bearing plate 24, the corner between the clip-receiving recess 16 and clip-retaining trough 20 would soon be rounded by placement and removal of the clip 18 from its holding position. Each removal would reduce the effectiveness of the clip in holding the container erect. The bearing plate 24, which is glued to the panel after routing of the recess and trough, has proven to be a simple, inexpensive, and effective means of greatly increasing the life of the interchangeable panels of these containers.

To further reduce the inadvertent removal of the clip during shipment, the edges 30 of the panel associated with the clip-receiving recess 16 preferably are beveled at an angle of forty-five degrees (45°). As shown in FIG. 2, the preferred resilient clip 18 of this invention, then, substantially conforms to the surface of the interfitting panels. The clip contacts the panels over a greater surface area, thus providing increased frictional connection between the clip and panels, and the clip is further recessed into the edges of the geometric solid to provide greater assurance that the clip will not be struck when the container is transported. When bevelled at 45°, the clip retains adequate resiliency, and the routing operation is relatively uncomplicated. Furthermore, the two panels match in angle and are readily interchangeable.

The clip-bearing plate 24 and access means 28 provided in this invention overcome today's expensive operation of routing suitable indentations in the panels to allow insertion of a bar underneath the clip. These indentations are required to pry or to lift the tabs of the clip from the clip-retaining trough.

The notched edge pattern has proven to be an excellent pattern to obtain the necessary strength. The run 13 of one panel fits with the step 14 of an adjacent panel, and the clip-receiving recesses 16 are aligned. Although FIG. 1 shows a container with two series, longer or shorter repetitive series may be used.

To ease transportation for some purposes, pallet stringers 32 may be attached to the bottom panel. These stringers 32 reinforce the bottom and allow for easy movement of the container. Furthermore, they reduce the cost of using this container with an ordinary pallet.

The panel 10 of FIG. 1 has four analogous edges. Each edge has two runs 13 and two steps 14. For a particularly preferred panel of ⅝-inch plywood, the dimensions of the edge portions proceeding from left to right are as follows:

the first run
    a first portion of 3⅛ inch length;
    a clip-receiving recess of 3¾ inch length;
    a portion of 3¾ inch length;

the first step
    a first portion of 3¾ inch length;
    a clip-receiving recess of 3¾ inch length;
    a portion of 3¾ inch length;

the second run
    a first portion of 3¾ inch length;
    a clip-receiving recess of 3¾ inch length;
    a portion of 3¾ inch length; and the second step, which is identical in dimensions to the first step.

I claim:

1. A reusable, modular, knockdown container having interchangeable panels, comprising:
   (a) a plurality of interchangeable panels, each panel having
      (i) notched edges including recessed steps capable of interfitting with adjacent panels to form a geometric solid,
      (ii) at least one clip-receiving recess on each edge of a panel capable of aligning with a respective recess on an adjacent panel in the solid and capable of receiving a clip recessed into the outer surfaces of adjacent panels, and
      (iii) a clip-retaining trough intersecting and associated with each clip-receiving recess and providing a bearing surface for holding a clip;
   (b) a resilient clip for each pair of clip-receiving recesses on adjacent panels, having
      (i) opposed tabs to bear against respective clip-retaining troughs on adjacent panels, and
      (ii) connecting means between the tabs resiliently holding the tabs, providing bearing force for the tabs, and capable of overlying the clip-receiving recess at a height which is, at most, flush with the surface of the panel; and
   (c) a clip-bearing plate associated with each clip-retaining trough to protect the corner between the recess and trough during placement and removal of the clip, wherein the clip-bearing plate is a metal angle which overlies the corner between the recess and trough, with a longer arm over the surface of the recess and a shorter arm over the bearing surface of the trough.

2. The container of claim 1 wherein the clip further includes an access in the connecting means to aid placement and removal of the clip by allowing levering against the clip-bearing plate.

3. The container of claim 2 wherein each panel further has a bevel on the edge associated with the clip-receiving recess.

4. The container of claim 1 wherein each panel further has a bevel on the edge associated with the clip-receiving recess.

5. The container of claim 4 wherein the connecting means for the clip includes a pair of generally planar ends arranged substantially perpendicular to each other and a central portion having a width substantially equal to the width of a clip-receiving recess and extending between the ends to intersect with the ends in obtuse angles.

6. The container of claim 4 wherein the connection means between the tabs overlies and substantially abuts the clip-bearing plate on a first panel, the bevel on the edge of the first panel, the bevel on the edge of the respective adjacent panel in the solid, and the clip-bearing plate on the adjacent panel to decrease the likelihood of inadvertent removal of the clip from the container.

7. The container of claim 1 wherein the connecting means for the clip includes a pair of generally planar ends arranged substantially perpendicular to each other and a central portion having a width substantially equal to the width of a clip-receiving recess and extending between the ends to intersect with the ends in obtuse angles.

8. The container of claim 1 wherein the geometric solid is a right rectangular parallelepiped.

9. The container of claim 8 wherein the parallelepiped is a cube.

10. The container of claim 9 wherein each panel of the cube has identical edges so that the panels are completely interchangeable.

11. The container of claim 10 wherein a bottom panel of the panels has a plurality of pallet stringers to differentiate the bottom panel from the other panels of the container.

12. The container of claim 5 wherein the connecting means further includes an access to aid placement and removal of the clip by allowing levering against the clip-bearing plate.

* * * * *